US012126043B2

United States Patent
Lim et al.

(10) Patent No.: US 12,126,043 B2
(45) Date of Patent: Oct. 22, 2024

(54) METHOD FOR MANUFACTURING CASE OF BATTERY MODULE AND CASE OF BATTERY MODULE

(71) Applicant: SK On Co., Ltd., Seoul (KR)

(72) Inventors: Ji Hoon Lim, Daejeon (KR); Myeong Hwan Ma, Daejeon (KR); Ju Yong Park, Daejeon (KR); Ji Hoon Park, Daejeon (KR)

(73) Assignee: SK On Co., Ltd., Seoul (KR)

( * ) Notice: Subject to any disclaimer, the term of this patent is extended or adjusted under 35 U.S.C. 154(b) by 37 days.

(21) Appl. No.: 17/545,174

(22) Filed: Dec. 8, 2021

(65) Prior Publication Data

US 2022/0181743 A1 Jun. 9, 2022

(30) Foreign Application Priority Data

Dec. 9, 2020 (KR) .................. 10-2020-0171124

(51) Int. Cl.
*H01M 50/406* (2021.01)
*H01M 10/6554* (2014.01)
*H01M 50/224* (2021.01)
*H01M 50/502* (2021.01)
*H01M 50/211* (2021.01)

(52) U.S. Cl.
CPC ..... *H01M 50/406* (2021.01); *H01M 10/6554* (2015.04); *H01M 50/224* (2021.01); *H01M 50/502* (2021.01); *H01M 50/211* (2021.01)

(58) Field of Classification Search
CPC ............ H01M 50/406; H01M 50/502; H01M 50/224; H01M 50/211; H01M 10/6554
See application file for complete search history.

(56) References Cited

U.S. PATENT DOCUMENTS

| 2018/0138565 A1* | 5/2018 | Lee | ............... H01M 10/6554 |
| 2018/0331336 A1 | 11/2018 | Choi et al. | |
| 2019/0305261 A1 | 10/2019 | Kim et al. | |

FOREIGN PATENT DOCUMENTS

| KR | 101547395 B1 | 8/2015 |
| KR | 1020180020546 A | 2/2018 |
| KR | 1020190114645 A | 10/2019 |

\* cited by examiner

*Primary Examiner* — Jimmy Vo
(74) *Attorney, Agent, or Firm* — The Webb Law Firm

(57) ABSTRACT

A method for manufacturing a lower case of a battery module includes an extrusion molding operation in which a metal material is extruded to mold a cooling plate member and a sidewall member of a battery module; a forging operation in which an internal surface of the cooling plate member is pressed with a punch, having an edge of a lower end provided vertically to form an accommodation groove; and a forming operation in which an embossed piece, protruding to an external surface of the cooling plate member by forming the accommodation groove, is removed.

6 Claims, 4 Drawing Sheets

METHOD FOR MANUFACTURING CASE OF BATTERY MODULE AND CASE OF BATTERY MODULE

CROSS-REFERENCE TO RELATED APPLICATION

This application claims priority to Korean Patent Application No. 10-2020-0171124 filed Dec. 9, 2020, the disclosure of which is hereby incorporated by reference in its entirety.

BACKGROUND OF THE INVENTION

1. Field of the Invention

The present disclosure relates to a method for manufacturing a case of a battery module and a case of a battery module.

2. Description of Related Art

With increased demand for mobile devices, electric vehicles, and the like, along with the development of related technologies, demand for a secondary battery cell as an energy source has rapidly increased. A secondary battery cell may be repeatedly charged and discharged, as mutual conversion between chemical energy and electrical energy is reversible in a secondary battery.

Among such secondary battery cells, a pouch-type secondary battery cell includes an electrode assembly accommodated in a pouch-shaped cell body member.

In addition, a plurality of secondary battery cells may be installed in an electric vehicle, or the like.

A conventional pouch-type secondary battery cell does not include a protruding delta fin portion, and thus, it has not been necessary to consider such a delta fin portion when the pouch-type secondary battery cell is mounted in a battery module.

However, a pouch-type secondary battery cell, in which such a delta fin portion is formed, has recently been developed. Therefore, it is necessary to consider even such a delta fin portion when manufacturing a lower case of a battery module in which the pouch-type secondary battery cell is accommodated.

SUMMARY OF THE INVENTION

An aspect of the present disclosure may provide a case of a battery module, considering even a delta fin portion of a secondary battery cell, and a method for manufacturing a lower case of a battery module.

According to an aspect of the present disclosure, a method for manufacturing a case of a battery module includes: an extrusion molding operation in which a metal material is extruded to mold a cooling plate member and a sidewall member of the battery module; a forging operation in which an internal surface of the cooling plate member is pressed with a punch, having an edge of a lower end provided vertically, to form an accommodation groove; and a forming operation in which an embossed piece, protruding to an external surface of the cooling plate member by forming the accommodation groove, is removed.

In the forging molding operation, the accommodation groove may be formed with the punch of which a radius of curvature of the edge of the lower end is 0.2 mm or less.

A portion, in which a bottom surface and a side surface of the accommodation groove are connected to each other, may be formed to have a radius of curvature of 0.2 mm or less.

The accommodation groove may be formed to have a depth less than or equal to 60% of a thickness of the cooling plate member.

In the extrusion molding operation, the sidewall member of the cooling plate member may be formed in a form in which the sidewall member is integrally provided on an edge of the cooling plate member.

In the extrusion molding operation, a portion, in which the cooling plate member and the sidewall member are connected to each other, may be formed to have a radius of curvature smaller than a thickness of the cooling plate member or the sidewall member.

In the extrusion molding operation, a portion, in which the cooling plate member and the sidewall member may be connected to each other, is formed to have a radius of curvature of 0.3 mm or less.

According to another aspect of the present disclosure, a case of a battery module includes: a cooling plate member on which a plurality of secondary battery cells are seated, the cooling plate member being provided with an accommodation groove in which a delta fin portion of the secondary battery cell is accommodated; and a sidewall member provided on an end of the cooling plate member. A portion, in which a bottom surface and a side surface of the accommodation groove are connected to each other, may be provided substantially vertically.

The portion, in which the bottom surface and the side surface of the accommodation groove are connected to each other, may be provided to have a radius of curvature of 0.2 mm or less.

The accommodation groove may be provided to have a depth smaller than or equal to 60% of a thickness of the cooling plate member.

The accommodation groove may include a plurality of accommodation grooves disposed at regular intervals.

The cooling plate member may be provided to be integrated with the sidewall member.

A portion, in which the cooling plate member and the sidewall member are connected to each other, may be provided to have a radius of curvature smaller than a thickness of the cooling plate member or the sidewall member.

A portion, in which the cooling plate member and the sidewall member are connected to each other, may be provided to have a radius of curvature of 0.3 mm or less.

DESCRIPTION OF THE INVENTION

Figure 1:
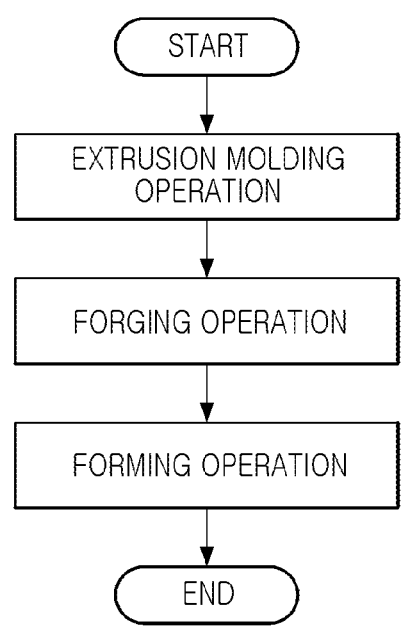
FIG. 1 is a flowchart illustrating a method for manufacturing a lower case of a battery module according to an embodiment of the present disclosure.

Prior to the description, it should be understood that the terms used in the specification and the appended claims should not be construed as being limited to general and dictionary meanings, but should be interpreted based on the meanings and concepts corresponding to technical aspects of the present disclosure on the basis of the principle that the inventor is allowed to define terms appropriately for the best explanation. Therefore, the configurations described in the following description with reference the accompanying drawings do not represent all technical concepts or ideas of the present disclosure but should be considered to be exemplary embodiments of the present disclosure. It should be understood that various modifications and equivalents of the embodiments may be devised within the scope of the present invention at the time of the filing of the application.

Hereinafter, exemplary embodiments of the present disclosure will be described in detail with reference to the accompanying drawings. In the drawings, the same elements are denoted by the same reference numerals as much as possible. Furthermore, detailed descriptions related to well-known functions or configurations may be omitted in order not to unnecessarily obscure subject matters of the present disclosure. For the same reason, some of the elements in the accompanying drawings are exaggerated, omitted, or shown schematically, and the size of each element may not entirely reflect the actual size thereof.

A secondary battery cell 4 may include an electrode assembly and a cell body member in which the electrode assembly is accommodated.

The electrode assembly, together with an electrolyte substantially included therein, may be accommodated in the cell body member to be used. The electrolyte may include a lithium salt, such as $LiPF_6$, $LiBF_4$, or the like, in an organic solvent, such as ethylene carbonate (EC), propylene carbonate (PC), diethyl carbonate (DEC), ethylmethyl carbonate (EMC), dimethyl carbonate (DMC), or the like. Further, the electrolyte may have a liquid, solid, or gel phase.

In addition, the cell body member is an element for protecting the electrode assembly and accommodating the electrolyte. As an example, the cell body member may be provided as a pouch-type member or a can-type member. The pouch-type member is in the form in which the electrode assembly is three-surface sealed to be accommodated. The pouch-type member is a member configured to fold and bond three surfaces (an upper surface and side surfaces, excluding one surface, mostly a lower surface) to seal while having the electrode assembly accommodated therein. The can-type member is in the form in which the electrode assembly is one-surface sealed to be accommodated. The can-type member is a member configured to fold and bond one surface (an upper surface excluding three surfaces, mostly a lower surface and side surfaces) to seal while having the electrode assembly accommodated therein.

The pouch-type secondary battery cell 4 has a limitation in which an unwanted portion, degrading energy density, is present in terms of a manufacturing method or a manufacturing process.

That is, the pouch-type secondary battery cell 4 may accommodate the electrode assembly by folding a bottom portion, a remaining portion except for three side portions to be sealed. A portion of the side portion adjacent to the bottom portion may be formed to protrude further outwardly than the bottom portion. Accordingly, the energy density may be decreased when the pouch-type secondary battery cell 4 is stacked on the battery module. In other words, the pouch-type secondary battery cell 4 may occupy a larger space as the sealed portion is folded to form a delta fin portion 4a, a further protruding portion.

In addition, an accommodation groove 30 may be formed in a lowercase 1 of the battery module to accommodate the secondary battery cell 4 while preventing a space from being occupied by the delta fin portion 4a.

If a lower end portion 3a is formed using a rounded punching die when the accommodation groove 30 is formed, wrinkling or cracking may occur around the accommodation groove 30. That is, when the accommodation groove 30 is formed using a punching die in which an edge 3b of the lower end portion 3a is not vertical, wrinkling or cracking may occur.

In the method for manufacturing a lower case of a battery module according to an embodiment, the accommodation groove 30 may be formed in the lower case 1 of the battery module in consideration of even the delta fin portion 4a of the secondary battery cell 4, but the accommodation groove 30 may be formed to prevent wrinkling or cracking from occurring. The method for manufacturing a lower case of a battery module according to an embodiment will be described later in detail with reference to FIGS. 1 to 3.

In addition, a lower case 1 of a battery module according to another embodiment, manufactured by the method for manufacturing a lower case of the battery module according to an embodiment, may include a cooling plate member 10 and a side wall member 20 and will later be described in detail with reference to FIGS. 4 to 6.

Figure 2A:
FIGS. 2A to 2C are front views illustrating resultant lower cases in respective operations of a method for manufacturing a lower case of a battery module according to an embodiment of the present disclosure.
Figure 2B:
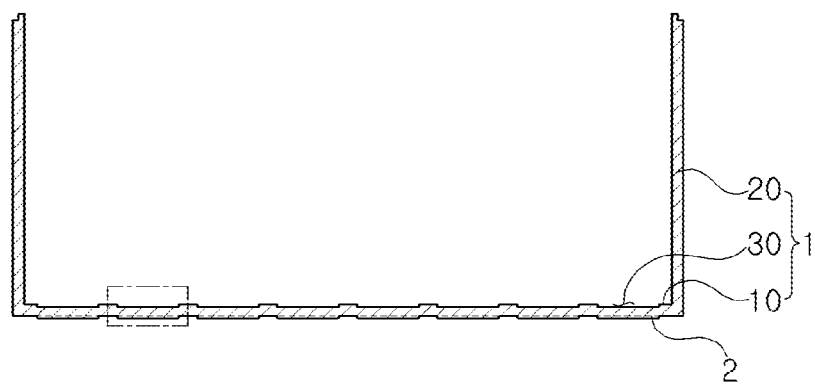
Figure 2C:

FIG. 1 is a flowchart illustrating a method for manufacturing a lower case of a battery module according to an embodiment. FIGS. 2A to 2C are front views illustrating resultant lower cases in respective operations of a method for manufacturing a lower case of a battery module according to an embodiment.

Referring to the drawings, the method for manufacturing a lower case of a battery module according to an embodiment may include an extrusion molding operation, a forging operation, and a forming operation.

The extrusion molding operation may be an operation of extruding a metal material to mold a cooling plate member 10 and a side wall member 20 of a battery module. In the extrusion molding operation, a metal material in a powder or semi-molten state may be pushed from a mold for extrusion molding, so that the cooling plate member 10 and the side wall member 20 may be integrally molded. The extrusion molding operation may be described with reference to FIG. 2A.

In addition, in the extrusion molding operation of the method for manufacturing a lower case of a battery module according to an embodiment, the sidewall member 20 and the sidewall member 20 may be formed in such a manner that the sidewall member 20 is integrally provided on the edge of the cooling plate member 10.

That is, the extrusion molding operation may be performed to integrally form the lower case 1 including the cooling plate member 10 and the side wall member 20. In this case, the side wall member 20 may be provide on an end of the cooling plate member 10 and may work together with the cooling member 10 to be formed in the form of lying "[" with open top.

In the extrusion molding operation of the method for manufacturing a lower case of a battery module according to an embodiment, a portion, in which the cooling plate member 10 and the side wall member 20 are connected to each other, may be formed to have a radius of curvature "R3" smaller than a thickness "t" of the cooling plate member 10 and the side wall member 20. This may be described with reference to FIG. 6.

That is, since the lower case 1 including the cooling plate member 10 and the side wall member 20 is molded by an extrusion process, rather than a bending process, the portion, in which the cooling plate member 10 and the sidewall member 20 are connected to each other, may be formed to have a radius of curvature "R3" smaller than the thickness "t" of the cooling plate member 10 or the side wall member 20.

Accordingly, the lower case 1 may further secure a space in which the secondary battery cell 4 may be accommodated. That is, the battery module including the lower case 1 may accommodate more secondary battery cells 4, and thus, may be configured to have high energy density.

Specifically, in the extrusion molding operation of the method for manufacturing a lower case of a battery module according to an embodiment, the portion, in which the cooling plate member 10 and the side wall member 20 are connected to each other, may be formed to have a radius of curvature "R3" equal to or less than 0.3 mm.

As an example, even when the thickness "t" of the cooling plate member 10 and the side wall member 20 is 4 mm, the portion, in which the cooling plate member 10 and the side wall member 20 are connected to each other, may be formed to have a radius of curvature "R3" less than 4 mm.

The forging operation may be an operation in which an internal surface of the cooling plate member 10 is pressed with a punch 3, having an edge 3b of the lower end portion 3a provided vertically to remove a radius of curvature "R1", to form an accommodation groove 30. The forging process may be described with reference to FIG. 2B.

Since an edge 3b of a lower end portion 3b of the punch 3 is vertical, a portion through which a bottom surface 30a and a side surface 30b of the accommodation groove 30 are connected to each other may also be formed to be vertical when the accommodation groove 30 is formed.

The term "vertical" means that a radius of curvature "R2" is not formed in consideration of a measurement limitation or a design acceptance limitation.

As described above, the radius of curvature "R2" is not formed in the portion through which the bottom surface 30a and the side surface 30b of the accommodation groove 30 are connected to each other, so that wrinkling or cracking may not occur around the accommodation groove 30.

This is based on the principle that wrinkling or cracking does not occur around a hole when the hole is formed by a piercing process. That is, the piercing process is performed to completely cut and remove a portion of a material, and material structures of the cut portion and a remaining portion are completely isolated from each other. Accordingly, a probability of occurrence of wrinkling or cracking caused by sagging between the material structures may be significantly reduced, and the forging operation is based on such a principle.

However, before the piercing process is completely performed to form a hole, the forging operation may be stopped to form only the accommodation groove 30 in the form of a groove. That is, the forging operation is to perform a semi-piercing process.

In addition, in the forging operation, the edge 3b of the lower end portion may be vertically formed using the punch 3, similarly to a cutting punch, such that a material structure is cut, similarly to the case in which the piercing process is performed.

The shape of the punch 3 may be defined in more detail such that the accommodation groove 30 is formed by the forging operation, which will be described in detail later with reference to FIG. 3.

The forming operation is an operation in which an embossed piece 2, protruding to an external surface of the cooling plate member 10, is removed by the molding of the accommodation groove 30. The forming operation may be described with reference FIG. 2C.

That is, the processing forming operation may be performed after the forging operation. In addition, when the accommodation groove 30 is formed by the semi-piercing process of the forging operation, the protruding embossed piece 2 may be formed on the external surface of the cooling plate member 10, opposing an internal surface of the cooling plate member 10 in which the accommodation groove 30 is formed. Accordingly, in the forming operation, the embossed piece 2 may be removed such that the cooling plate member 10 is formed to have a smooth external surface.

To this end, in the forming operation, the embossed piece 2 may be removed using a cutter. In addition, in the forming operation, the embossed piece 2 may be abraded to be removed. However, the forming operation is not limited thereto, and may include any process as long as it may remove the embossed piece 2.

Figure 3:
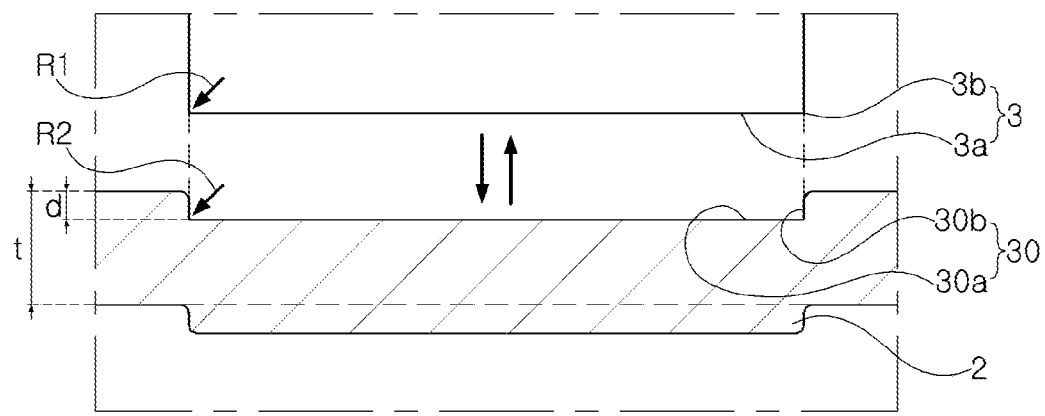
FIG. 3 is a front view illustrating a punch for performing a forging operation according to an embodiment of the present disclosure and a portion of a pressed accommodation groove.

FIG. 3 is a front view illustrating a punched and pressed accommodation groove portion in which a forging operation according to an embodiment of the present disclosure is performed.

FIG. 3 is a front view illustrating a punch 3 for performing a forging operation according to an embodiment and a portion of a pressed accommodation groove 30.

Referring to the drawing, in the forging operation of a method for manufacturing a lower case of a battery module according to an embodiment, the accommodation groove 3 may be formed using the punch 3 including the edge 3b of the lower end portion 3a having a radius of curvature of 0.2 mm or less.

As described above, the radius of curvature "R1" of the edge 3b of the lower end portion 3a of the punch 3 is 0.2 mm or less. This may refer to a numerical value at which the radius of curvature "R1" is not formed in consideration of a measurement limitation or a design acceptance limitation.

In addition, when the radius of curvature "R1" of the edge 3b of the lower end portion 3a of the punch 3 is 0.2 mm or less, formation of the accommodation groove 30 using the punch 3 may cause the radius of curvature "R2" of the portion, in which the bottom surface 30a and the side surface 30b of the accommodation groove 30 are connected to each other, to be also 0.2 mm or less.

As described above, in the method for manufacturing a lower case of a battery module according to an embodiment, the accommodation groove 30 may be formed such that the radius of curvature "R2" of the portion, in which the bottom surface 30a and the side surface 30b are connected to each other, is 0.2 mm or less.

This may refer to a numerical value at which the radius of curvature R2 of the accommodation groove 30 is not formed in consideration of the measurement limitation or the design acceptance limitation. That is, the accommodation groove 30 may be formed in a semi-pierced state in the cooling plate member 10. Accordingly, a portion cut and downwardly moved to form the accommodation groove 30 and a portion adjacent thereto may be completely separated without sagging of a material structure. As a result, wrinkling or cracking may not occur in a portion in which the accommodation groove 30 is formed.

In addition, in the method for manufacturing the lower case of the battery module according to an embodiment of the present invention, the accommodation groove 30 may be formed at a depth "d" less than or equal to 60% of the thickness "t" of the cooling plate member 10.

This is to prevent the forging operation from being developed to a piercing process, in which the accommodation groove 30 is completely pierced into a hole, through the half-piercing process. That is, in the process in which the accommodation groove 30 is formed to have the depth "d" greater than or equal to 60% of the thickness "t" of the cooling plate member 10, only a hole may be formed in the cooling plate member 10 but is not formed in the form of a groove.

Accordingly, the accommodation groove 30 is formed to have the depth "d" less than or equal to 60% of the thickness "t" of the cooling plate member 10, so that wrinkling or cracking may be prevented from occurring around the accommodation groove 30 while forming the accommodation groove 30.

In addition, to form the accommodation groove 30, the accommodation groove 30 may be formed to have a depth of at least 1 mm. For example, when the thickness "t" of the cooling plate member 10 is 4 mm, the accommodation groove 40 may be formed to have a depth greater than or equal to 25% of the thickness "t" of the cooling plate member 10.

Figure 4:
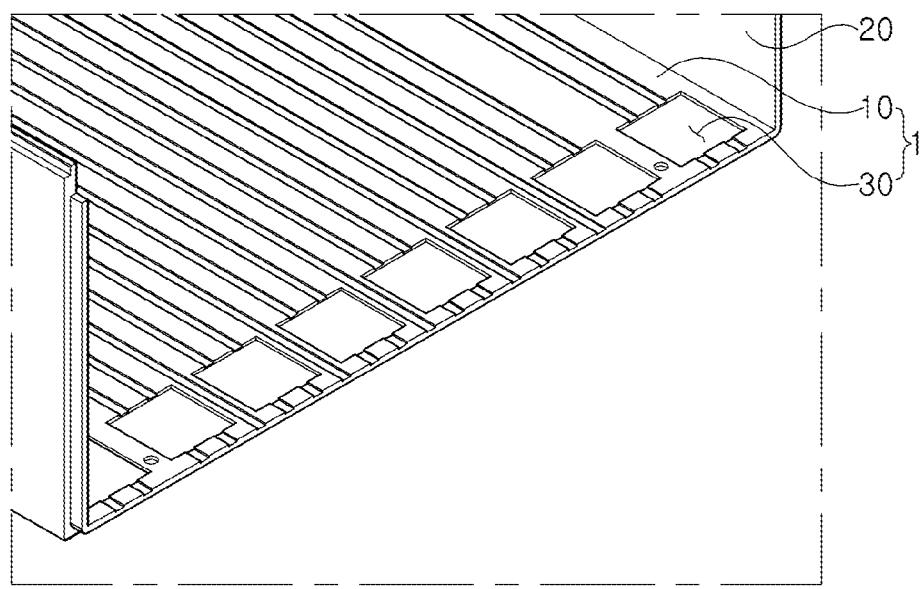
FIGS. 4 and 5 are perspective views illustrating a lower case of a battery module according to another embodiment of the present disclosure.
Figure 5:
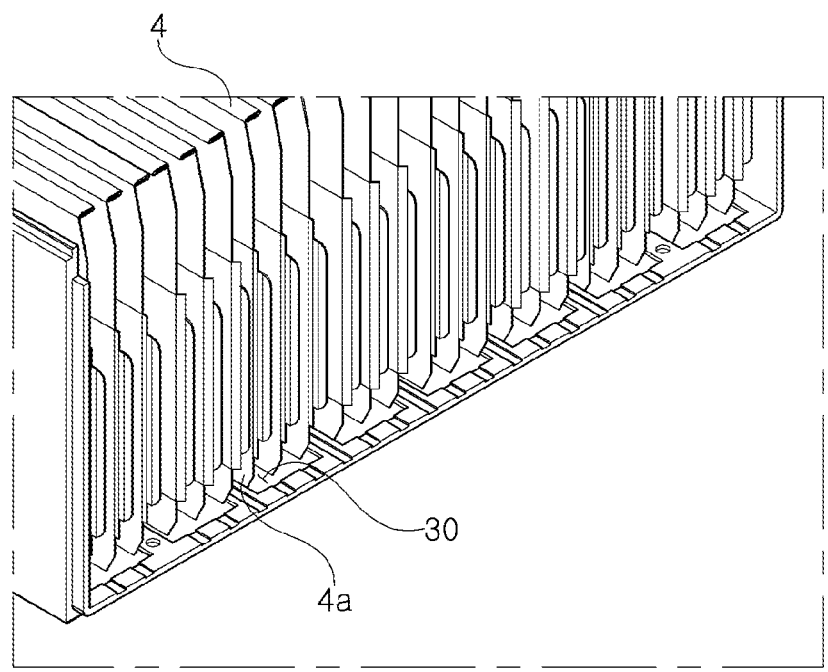
Figure 6:
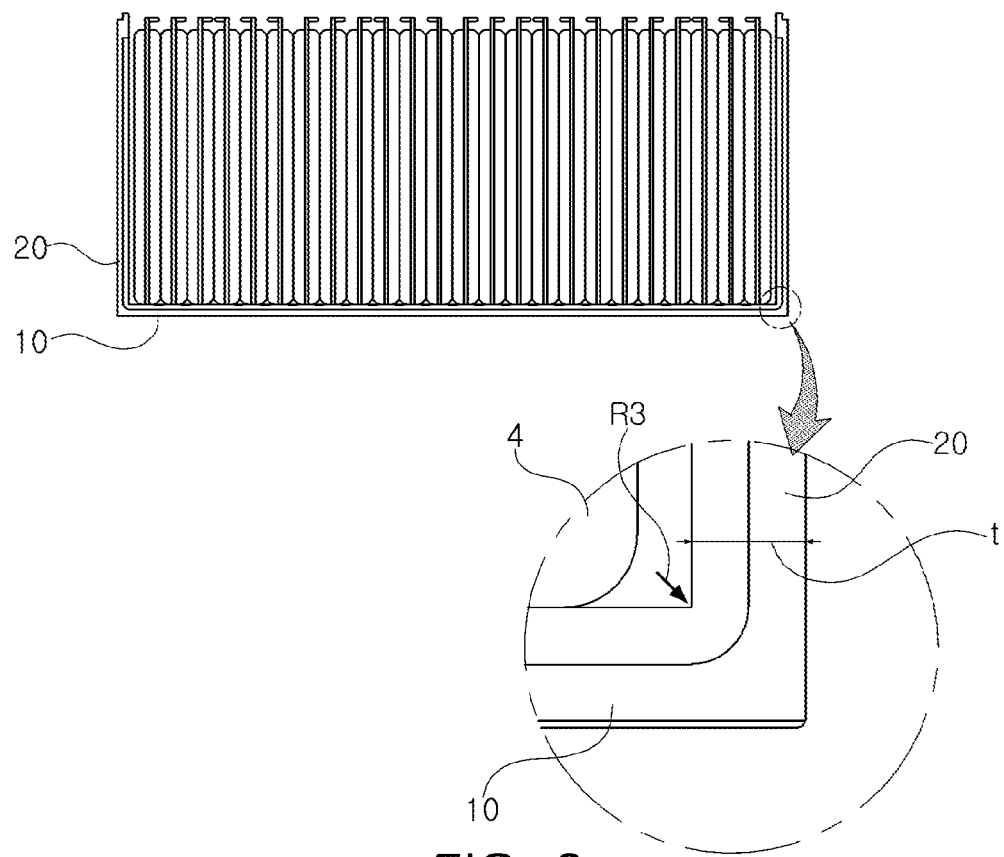
FIG. 6 is a front view illustrating a lower case of a battery module according to another embodiment of the present disclosure.

FIGS. 4 and 5 are perspective views illustrating a lower case 1 of a battery module according to another embodiment. FIG. 4 illustrates only the lower case 1, and FIG. 5 illustrates a state in which the secondary battery cell 4 is seated in the lower case 1. FIG. 6 is a front view illustrating a lower case 1 of a battery module according to another embodiment.

The lower case (1) may accommodate a secondary battery cell 4 by working together with an upper case.

That is, the lower case 1 and the upper case may serve as a body of the battery module in which a plurality of secondary battery cells 4 are accommodated.

As described above, the lower case 1 and the upper case may be configured to accommodate a plurality of secondary battery cells 4 and may serve to transfer electric energy, generated from the secondary battery cells 4, to an external entity or to transfer electric energy to the secondary battery cell 4 from an external entity.

The upper case may be coupled to an upper end portion of the lower case 1 to serve to protect the upper end portion of the secondary battery cell 4.

The lower case 1 of the battery module according to another embodiment may include a cooling plate member 10 and a sidewall member 20.

The cooling plate member 10 may be a plating member on which a plurality of secondary battery cells 4 are seated, and may be provided with an accommodation groove 30 in which a delta fin portion 4a of the secondary battery cell 4 is accommodated. The sidewall member 20 may be provided on an end of the cooling plate member 10.

As described above, the sidewall member 20 may be provided on the end of the cooling plate member 10 to form an opening having a lying "[" shape with an open top by working together with the cooling plate member 10.

The cooling plate member 10 may serve to support the plurality of secondary battery cells 4 seated thereon.

In addition, a thermally conductive material may be provided between the cooling plate member 10 and a bottom portion of the secondary battery cell 4 to increase heat transfer efficiency between the cooling plate member 10 and the bottom portion of the secondary battery cell 4.

The cooling plate member 10 may be configured to transfer heat, generated in the secondary battery cell 4, to an external heat sink to cool the secondary battery cell 4.

The sidewall member 20 may also discharge the heat, generated in the secondary battery cell 4, to an external entity.

The lower case 1 may include front and rear members adjacent to the sidewall member 20, and thus, may be configured to surround the plurality of secondary battery cells 4.

The lower case 1 may be provided with additional components such as a busbar member, electrically connecting the secondary battery cell 4 to an external entity, and the like.

A portion, in which the bottom surface 30a and the side surface 30b of the accommodation groove 30 are connected to each other, may be vertically formed to remove a radius of curvature "R2." The term "vertically" means that the radius of curvature "R2" is not formed in consideration of a measurement limitation or a design acceptance limitation.

The accommodation groove 30 may be formed so as not to form the radius of curvature R2 in the portion through which the bottom surface 30a and the side surface 30b are connected, and thus, wrinkling or cracking may not occur.

More specifically, the accommodation groove 30 of the lower case 1 of the battery module according to another embodiment may be provided such that the radius of curvature "R2" of the portion, in which the bottom surface 30a and the side surface 30b are connected to each other, is 0.2 mm or less.

In addition, the accommodation groove 30 of the lower case 1 of the battery module according to another embodiment may be provided to have a depth "d" less than or equal to 60% of the thickness "t" of the cooling plate member 10. Accordingly, when the accommodation groove 30 is formed, the cooling plate member 10 may be formed to be incompletely pierced.

To form the accommodation groove 30, the accommodation groove 30 may be formed to have a depth of at least 1 mm. As an example, when the thickness "t" of the cooling plate member 10 is 4 mm, the accommodation groove 40 may be formed to have a depth greater than or equal to 25% of the thickness "t" of the cooling plate member 10.

The accommodation groove 30 of the lower case 1 of the battery module according to another embodiment may include a plurality of accommodation grooves 30 formed in the cooling plate member 10 at regular intervals.

That is, since a plurality of the secondary battery cells are accommodated in the lower case 1, the accommodation groove 30 may include a plurality of the accommodation grooves 30 to accommodate delta fin portions 4a of all secondary battery cells 4.

In addition, the plurality of the accommodation grooves 30 may be formed at regular intervals, so that rigidity of the lower case 1 may be maintained at the regular intervals. That is, formation of weak and vulnerable points may be prevented.

In addition, the cooling plate member 10 of the lower case 1 of the battery module according to another embodiment may be provided to be integrated with the sidewall member 20.

Accordingly, bonding strength may be higher than that when the cooling plate member 10 and the sidewall member 20 are separately provided.

In the lower case 1 of the battery module according to another embodiment, a radius of curvature "R3" of a portion, in which the cooling plate member 10 and the sidewall member 20 are connected to each other, may be smaller than the thickness "t" of the cooling plate member 10 or the sidewall member 20.

Accordingly, the lower case 1 may further secure a space in which the secondary battery cell 4 may be accommodated. That is, the battery module including the lower case 1 may accommodate more secondary battery cells 4, and thus, may be configured to have high energy density.

Specifically, in the lower case 1 of the battery module according to another embodiment, the radius of curvature "R3" of a portion, in which the cooling plate member 10 and the sidewall member 20 are connected to each other, may be 0.3 mm or less.

As an example, even when the thickness "t" of the cooling plate member 10 and the sidewall member 20 is 4 mm, the radius of curvature "R3" of a portion, in which the cooling plate member 10 and the sidewall member 20 are connected to each other, may be smaller than 4 mm.

As described above, a lower case of a battery module according to the present disclosure may be manufactured in consideration of even a delta fin portion of the secondary battery cell, and a method for manufacturing a lower case of a battery module according to the present disclosure may be advantageous for manufacturing such a lower case of a battery module.

In another aspect, a method for manufacturing a lower case of a battery module according to the present disclosure may be advantageous for manufacturing a lower case of a battery module while preventing wrinkling or cracking from occurring when forming an accommodation groove in which a delta fin portion of a secondary battery cell is accommodated.

In addition, since the heat transfer material 90 fixes the sealing portions 202, the battery cells 10 may be securely fixed to the case 30 without being shaken by external vibrations or impacts.

While exemplary embodiments have been shown and described above, it will be apparent to those skilled in the art that modifications and variations could be made without departing from the scope of the present disclosure as defined by the appended claims.

What is claimed is:

1. A case of a battery module, the case comprising:
a cooling plate member on which a plurality of secondary battery cells are seated, the cooling plate member being provided with an accommodation groove in which a delta fin portion of the secondary battery cells is accommodated; and
a sidewall member provided on an end of the cooling plate member,
wherein the accommodation groove is formed to have a square shape,
wherein a portion, in which a bottom surface of the accommodation groove and all side surfaces of the accommodation groove are connected to each other, is provided substantially vertically,
wherein the accommodation groove includes a plurality of accommodation grooves disposed at regular intervals, and
wherein at least two delta fin portions are accommodated in each of the plurality of accommodation grooves.

2. The case of claim 1, wherein the portion, in which the bottom surface and the side surface of each of the plurality of accommodation grooves are connected to each other, is provided to have a radius of curvature of 0.2 mm or less.

3. The case of claim 1, wherein each of the plurality of accommodation grooves is provided to have a depth smaller than or equal to 60% of a thickness of the cooling plate member.

4. The case of claim 1, wherein the cooling plate member is provided to be integrated with the sidewall member.

5. The case of claim 4, wherein a portion, in which the cooling plate member and the sidewall member are connected to each other, is provided to have a radius of curvature smaller than a thickness of the cooling plate member or the sidewall member.

6. The case of claim 4, wherein a portion, in which the cooling plate member and the sidewall member are connected to each other, is provided to have a radius of curvature of 0.3 mm or less.

* * * * *